Patented Sept. 9, 1947

2,427,212

UNITED STATES PATENT OFFICE 2,427,212

REMOVAL OF PEROXIDES FROM HYDROCARBON OILS

Lawrence M. Henderson, Winnetka, Donald C. Bond, Northbrook, and Michael Savoy, Chicago, Ill., assignors to The Pure Oil Company, Chicago, Ill., a corporation of Ohio No Drawing. Application December 2, 1944, Serial No. 566,400

9 Claims. (Cl. 196—43)

This invention relates to a method for removing peroxides from hydrocarbon oils, and particularly from cracked gasoline.

Upon standing in storage, cracked gasoline has a tendency to form peroxides, which in turn promote formation of gum. The presence of the peroxides and the resulting gum are detrimental in automotive engines, since they cause clogging of the carburetor and other portions of the engine and sticking of the valves.

We have discovered that these peroxides can be eliminated to a large extent by subjecting the gasoline to treatment with aqueous alkali solution containing a small amount of phenolic substance which is capable of being oxidized to the quinone structure. As examples of phenolic materials which are suitable for use in our invention may be mentioned pyrogallol, butyl pyrogallol, normal-butyro pyrogallol, gallic acid, tannic acid, anthragallol, 3,4 dihydroxy diphenyl, 2,5 dihydroxy diphenyl, and hard wood tar fraction boiling between approximately 240–300° C. These high-boiling tars contain trihydroxy phenols and derivatives thereof.

In accordance with our invention aqueous alkali solution containing preferably sodium or potassium hydroxide in amounts of approximately 5 to 25% by weight, and containing a phenolic substance in amounts of approximately 1 to 3% by weight, is contacted with the gasoline, or other hydrocarbon liquid, from which peroxides are to be removed. Contact may be effected by forcing the hydrocarbon liquid through a body of the alkali solution, or by countercurrent contact of the hydrocarbon liquid and alkali solution in a tower packed with contacting surfaces such as Raschig rings or Berl saddles; or by recirculation of the mixed solution and liquid through an agitating device. The extent of removal of the peroxides is dependent primarily on the time of contact between the alkali solution and hydrocarbon liquid and the relative amounts of phenolic substance and peroxides present. It is believed that the phenolic substance in the presence of the alkali solution reduces the peroxides, and in turn is oxidized to the quinone structure. Therefore it is important that sufficient phenolic substance is present to reduce the entire amount of peroxides present. Although we find that 1 to 3% of phenolic substance in the alkali solution is sufficient, larger amounts may be used provided the phenolic substance is soluble in the alkali solution in the amount added.

The contact between the hydrocarbon liquid to be treated and the alkali solution may be effected at atmospheric temperature and pressure, although superatmospheric pressure may be used if desired, and temperatures above atmospheric temperature, but preferably not above the vaporization temperature of either the liquid or the alkali solution under the existing pressure conditions.

In order to demonstrate the invention, a cracked gasoline, which upon standing was found to have a peroxide number of 16.7 as determined by the method set forth in Industrial & Chemical Engineering, 23, pp. 1254–9 (1931), was forced under air pressure of 10 lbs. per square inch at a rate of 30 cc. per minute through a body of 750 cc. of an alkali solution contained in a 1 inch steel pipe 6 feet long packed with $\frac{1}{4}$ inch Berl saddles. The alkali solution was prepared by mixing together 25 parts by weight of sodium hydroxide, 6.4 parts by weight of commercial cresols, 18.6 parts by weight of naphthenic acids, 54 parts by weight of water and 1 part by weight of high boiling wood tar boiling between approximately 240–300° C. (I Tar Oil) obtained from Tennessee Products Corporation. The resulting gasoline was water-washed and the peroxide number again determined. It was found that the peroxide number had been reduced to 7.1. More complete removal of peroxides could have been obtained by contacting the gasoline with larger quantities of the alkali solution or with alkali solution containing larger quantities of phenolic substances.

The alkali solution can be regenerated by contacting it with any suitable reducing agent. One method of regenerating the solution is to contact it with gasoline containing mercaptans. By contacting the alkali solution with the mercaptans the phenolic substances are reduced from the quinone form back to the phenolic form, and the mercaptans are oxidized to disulfides, thereby sweetening the gasoline.

In practicing the invention the alkali solution may be a simple solution of caustic alkali and water, plus phenolic substances, or the alkali solution may contain solubility promoters such as alkali metal isobutyrates, alkali metal naphthenates and alkali metal salts of alkyl phenolates, or mixtures thereof. The presence of a solubility promoter increases the efficiency of the process.

It will be seen therefore that we have succeeded in providing a method for reducing the peroxide number of gasoline and thereby reducing gum formation caused by such gasolines when used in automotive engines.

It is claimed:

1. The method of removing peroxides from hydrocarbon oil which has deteriorated during storage consisting in contacting said oil with an alkali solution containing a phenolic substance which is capable of being oxidized to the quinone structure.

2. The method in accordance with claim 1 in which the phenolic substance is a high-boiling fraction hard wood tar.

3. The method of removing peroxides from hydrocarbon oil which has deteriorated during storage consisting in contacting said oil with an aqueous alkali solution containing sufficient phenolic substance capable of being oxidized to the quinone structure to reduce the entire peroxide content of said oil.

4. Method in accordance with claim 3 in which the phenolic substance is hard wood tar boiling between approximately 240 and 300° C.

5. Method in accordance with claim 3 in which the alkali solution is regenerated by contact with mercaptan-containing hydrocarbon oil.

6. A process for removing peroxides from hydrocarbon oil which has deteriorated during storage and converting mercaptan in a different body of oil to disulfides consisting in alternately contacting oil corresponding to the first mentioned oil with an aqueous caustic alkali solution containing sufficient phenolic material capable of being oxidized to the quinone structure to reduce the entire peroxide content of said oil and then contacting said second mentioned oil with the alkali solution separated from the first mentioned oil.

7. Method in accordance with claim 1 including the step of separating the alkali solution from the oil and regenerating said solution by contacting it with mercaptan-containing oil.

8. Method in accordance with claim 1 in which the phenolic substance is butyl pyrogallol.

9. Method in accordance with claim 1 in which the phenolic substance is tannic acid.

LAWRENCE M. HENDERSON.
DONALD C. BOND.
MICHAEL SAVOY.

REFERENCES CITED

The following references are of record in the file of this patent:

UNITED STATES PATENTS

| Number | Name | Date |
|---|---|---|
| 2,015,038 | Pevere | Sept. 17, 1935 |
| 1,951,207 | Rather et al. | Mar. 13, 1934 |
| 1,951,206 | Rather et al. | Mar. 13, 1934 |
| 1,951,205 | Rather et al. | Mar. 13, 1934 |
| 2,084,575 | Day | June 22, 1937 |
| 1,859,262 | Shaw | May 17, 1932 |
| 2,316,092 | Loyd | Apr. 6, 1943 |
| 2,115,781 | Morrell | May 3, 1938 |
| 2,257,078 | Soday | Sept. 23, 1941 |

OTHER REFERENCES

Gruse et al., "Chemical Technology of Petroleum" (1942), McGraw-Hill Book Co., Inc., New York city, pages 125 to 135.